United States Patent Office 3,160,620
Patented Dec. 8, 1964

3,160,620
COAGULATION OF CHLOROPRENE POLYMER LATICES AND ISOLATION OF THE POLYMER THEREFROM
Robert E. A. Petersen, Louisville, Ky., assignor to E. I. du Pont de Nemours and Company, Wilmington, Del., a corporation of Delaware
No Drawing. Filed July 10, 1962, Ser. No. 208,932
5 Claims. (Cl. 260—92.3)

The invention relates to polymers of chloroprene and to a process for isolating them from their aqueous dispersions. It further relates to a novel coagulant used in this process and to the treatment of the latex before coagulation.

The usual methods for isolating natural and synthetic rubbers from their aqueous dispersions (latices) in a dry form suitable for further manufacturing operations are not directly applicable to polymers of chloroprene. This results in most cases from the fact that chloroprene polymer, as ordinarily coagulated, forms large, impervious masses from which it is impossible or impractical to remove dispersing agents (or other electrolytes formed from them), which are harmful in the final product.

One process used to avoid this difficulty involves freezing the polymer latex, after first acidifying, in thin layers thus giving, after melting of the ice crystals, a porous coagulum which is easily washed free of remaining electrolytes. See U.S. 2,187,146. Another process is to make the chloroprene polymers in a dispersion in which the emulsifying agent is an ammonium salt and to isolate the polymer from it by heating to boil off the water and to decompose the ammonium salts, leaving the corresponding acids, which are usually harmless, remaining in the polymer. See U.S. 2,914,497. The first of these processes has the disadvantage of rather high operating costs because of the refrigeration and additional chemicals required. The second is rather limited as to the emulsifying agents which can be used.

A third process, described in U.S. 2,371,722, is to mix the dispersion and coagulating agent, usually a salt solution, and then extrude the resulting coagulated mass, under pressure produced by a helical worm rotating in a suitable housing, through small openings, thus squeezing out part of the water and dissolved salts. The washing is continued by similar extrusions with fresh water and finally most of the remaining water is removed by a last extrusion. This process has the disadvantage of requiring heavy equipment and high power input, which are costly and give high temperatures which may damage the product.

Another type of isolation involves coagulating the latex in the form of ribbons, sheets, or threads by contact with a liquid coagulating agent. This may be done by passing the latex under pressure in a continuous stream into a coagulating bath through a suitable orifice or by applying the latex to a rotating drum wet with the coagulant. In the latter method, it is particularly advantageous to use two oppositely rotating rolls, and to complete the coagulation by adding more coagulant to the nip formed between them. A uniform film of the type required for further washing and drying is formed, provided that such mechanical features as the rates of rotation of the rolls, their distance apart, and the rates of feed of the latex and coagulant are properly chosen, and also provided that a proper coagulant is used.

The selection of such a coagulant is surrounded by many difficulties. It is possible to coagulate a latex in which the dispersing agent is of the type commonly used in the polymerization of chloroprene, that is an alkali metal salt of a fatty or resin acid, by any eletcrolyte which can destroy this resinate by forming either the water-insoluble acid or one of its water-insoluble salts. In practice, however, most electrolytes are unsatisfactory for coagulating the latex in continuous sheet form suitable for washing and drying. Thus many electrolytes do not coagulate the latex completely or at all when used at practical concentrations. Others give sheets which are too weak to be handled or are sticky and cannot be removed from the surfaces on which they are formed or stick to the rolls, bars, and other devices used in transporting, washing and drying the sheets. Other electrolytes cannot be used because they have a bad effect upon the stability or working characteristics or curing properties of the product.

An object of this invention is to provide a process for isolating chloroprene polymer from its latex and to make it possible to obtain the polymer in the form of a continuous structure. A further object of this invention is to provide a novel solution for coagulating a chloroprene polymer latex which solution overcomes the disadvantages previously stated. Other objects will appear hereinafter.

These and other objects are accomplished by providing a chloroprene polymer dispersion in an aqueous solution of a water-soluble salt of a water-insoluble carboxylic acid of the aliphatic and cycloaliphatic series and by contacting said dispersion with an aqueous coagulating solution containing 0.1 to 0.5% by weight of a water-soluble calcium salt and 0.05 to 0.15% by weight of hydroxyethyl cellulose, and maintaining a pH not greater than about 6.5 by addition of acid during the formation of the chloroprene polymer coagulum.

With the proper manipulative steps the coagulum is obtained as a continuous, uniform structure. A representative process and equipment therefor are hereinafter described.

The composition of this coagulant is critical for practical operation. Each of the three ingredients (water-soluble calcium salt, acid and hydroxyethyl cellulose) is required and must be present within the ranges called for. Smaller quantities of the electrolytes fail to give complete coagulation or the required film properties and larger quantities, beside adding to the material cost, give too rapid a cogulation, and greatly increase the difficulty of washing the coagulum and makes it impractical to reduce the electrolyte content of the finished chloroprene polymer to an acceptable value, associated with low water absorption and good electrical properties. Similarly, smaller quantities of hydroxyethyl cellulose do not sufficiently regulate the coagulation but allow a rapid and complete coagulation at the surface, thus interfering with adequate coagulation throughout the rest of the latex. On the other hand, larger amounts than called for increase the viscosity of the coagulant inconveniently and give too slow a coagulation.

Representative examples of the water-soluble calcium salt include the nitrate, chloride, bromide, thiocyanate, and acetate, the chloride being preferred. Obviously, a calcium salt which would, by itself or upon acidification, have an oxidizing action (calcium chlorate) or give an odor (calcium hydrosulfide or hydrosulfite) would be undesirable, although functioning like the others as a coagulant. Similarly, although obviously any soluble acid stronger than the carboxylic acid forming the salt of the dispersing agent will acidify the system, an acid would be unsuitable if it precipitated the calcium (as sulfuric or phosphoric would) or had an oxidizing action on the polymer. Representative acids include hydrochloric, which is preferred, acetic, and nitric.

In continuous operation, the bath in contact with the coagulating latex is maintained at a predetermined composition within the defined limits by continuously adding appropriate quantities of water-soluble calcium salt, acid, and hydroxyethyl cellulose, all preferably as dilute aqueous solutions. A constant quantity of solution is maintained in the bath by continuously withdrawing a portion of it, or alternatively, when necessary, adding water. Since the latex is alkaline and the resinates or other dispersing agents which it contains are capable of reacting with acid, a relatively large amount of acid must be added to maintain the required pH. Water is added as solvent for the agents being added and, when the coagulum removes large amounts of water, to maintain a constant amount of solution in the bath, as mentioned above. Salts formed by the neutralization of the alkali in the latex by the added acid and by the reaction of the calcium salt with the dispersing agent such as sodium resinate, reach a considerable concentration in the bath at equilibrium. Calcium resinate or other salts of the carboxylic acids formed at the same time are insoluble in water and remain dispersed in the chloroprene polymer, upon which it has a stabilizing action. Much of the electrolyte leaves the bath dissolved in the water associated with the coagulum.

The chloroprene polymers to which the present invention is applied may vary greatly in viscosity and plasticity from those which are scarcely plastic enough to be usefully processed after drying, to those which are too plastic to be dried at elevated temperatures but are still firm enough to form self-supporting sheets at ordinary temperatures. The plastic or plasticizable polymers processed in the present invention may be made in the presence of any of the chain terminating or other modifying agents known in the art, for example aliphatic mercaptans, iodoform, sulfur, and the dialkyl xanthogen disulfides. The chloroprene polymers processed include both the homopolymers of chloroprene and its copolymers containing minor amounts (less than 50% of the total) of other polymerizable monomers, representative examples of which are styrene, acrylonitrile, and 2,3-dichlorobutadiene-1,3. The concentration of polymer in the latex is most conveniently between 25 and 50% by weight.

The water-soluble salts of water-insoluble carboxylic acids of the aliphatic and cycloaliphatic series are commonly derived from fats, fatty oils, and resins. The latex used should ordinarily be free from acid stable dispersing agents and stabilizers. The following examples use the sodium and potassium salts of disproportionated rosin, which is typical of the other dispersing agents such as the sodium, potassium, and ammonium salts of rosin, hydrogenated rosin, tall oil acids, and oleic acid used in making dispersions of chloroprene polymers, all being within the scope of the present invention.

The alkalinity of the latex before mixing with the coagulant is important when an isolated product completely soluble in aromatic hydrocarbon is desired. In this case the pH of the latex should be below 8.5. This is the preferred latex. The high pH of the latices usually made may be reduced by partial neutralization with acids. Carbon dioxide is preferred for this purpose because it is inexpensive, easy, and safe to use, since, quite unexpectedly, an excess causes no precipitation.

The latex to be coagulated to form a continuous, self-supporting thread or sheet may be extruded directly into the coagulating bath of the present invention through an orifice, as described in U.S. Patent 1,967,865. This orifice may be circular, but is preferably slit-like so as to give a ribbon-like sheet more suitable for washing and drying. The slit may be formed by two glass or metal jaws, accurately ground and polished so as to give an opening of uniform and adjustable width, usually about 0.01 inch (10 mils). Still using the coagulant of the present invention, the latex may also be coagulated as a continuous, self-supporting sheet, suitable for subsequent washing and drying, by the process as described hereinafter. This is the preferred method since it may be operated so as to give much thicker sheets, up to 100 mils or more, and is free from the mechanical difficulties of the extrusion methods. This process includes the steps of rotating a pair of roughened rolls, wet with the coagulant, in opposite directions about parallel axes spaced so that the rolls are separated by a uniform, narrow passage or nip at which both move downward, and are less than half immersed in a bath of the coagulant, applying the latex to be coagulated uniformly to one or both of the rotating rolls at such a rate that the resulting bank of coagulum keeps the nip closed but does not exceed its capacity, maintaining an excess of coagulant in the trough formed jointly by the rolls, the coagulum in the nip, and dams or flanges at the ends, and removing the resulting continuous strip of coagulum as it passes downward from the nip. This strip is of uniform width, thickness, and composition and is strong and free from stickiness and accordingly is easily handled in later operations. Preferably, coagulant from the bath is circulated to the nip and the rolls are not immersed in the bath. The make-up feeds of coagulant components may be added to the bath or directly to the nip.

The coagulum formed by this or by the extrusion method contains a large portion of water in the form of a solution of about the same composition as the coagulating bath. This solution may be largely removed by applying pressure, leaving a porous structure which readily reabsorbs 50 to 60% of the original volume of water. Thus by alternately squeezing and immediately exposing to fresh water, the electrolytes are almost completely removed from the coagulum. A final squeeze reduces the water content to about 30%. This water is then removed by heating the sheet, for example to 100–160° C. by infrared radiation in a current of air.

It is highly unexpected that a coagulum of plastic chloroprene polymer would be sufficiently sponge-like to reabsorb almost instantaneously a volume of fresh water equal to half or more of the solution squeezed out.

The following examples will better illustrate the nature of the present invention; however, the invention is not intended to be limited to these examples. Parts and percents are by weight unless otherwise indicated.

*Example 1*

Polychloroprene dispersion is made by dissolving three parts by weight of disproportionated rosin and 0.25 part of dodecyl mercaptan in 100 parts of chloroprene, dispersing this in 118 parts of water containing 0.63 part of sodium hydroxide and 0.34 part of sodium sulfite and then polymerizing at 40° C., with the addition of potassium persulfate and the sodium salt of anthraquinone beta-sulfonic acid as required to maintain a convenient rate of polymerization until about 70% of the chloroprene has been polymerized. The polymerization is then stopped by adding para-tertiary-butyl catechol and thiodiphenylamine. The unpolymerized chloroprene is removed by steam distillation at reduced pressure.

The latex is processed in the equipment last described above. The rolls are 12 inches in diameter, the space between them is bounded by dams 10 inches apart, and the adjustable clearance between the rolls is set at 0.01 inch or 10 mils. The roll to which the latex is applied has a roughened recess portion 50 mils deep about its circumference and rotates at a peripheral speed of 25 feet per minute. The other roll has a mating roughened raised portion 50 mils high and rotates at 29 feet per minute.

The latex is applied as a uniform layer to the recessed roll at a rate furnishing 94 pounds of polychloroprene per hour and the coagulant is circulated by a pump from the bath so as to fill and overflow the trough between the rolls. Fresh hydrochloric acid as a 10% solution is added to the recycle line at a rate of 0.17 pound per hour of hydrogen chloride. The calcium chloride as a 5% aqueous solution is added at 1.1 pounds per hour and the hydroxyethyl cellulose as a 0.5% aqueous solution at 0.056 pound per hour.

The coagulation bath, after coagulation has proceeded long enough to establish equilibrium, contains 0.20% by weight of calcium chloride, 0.63% sodium chloride and 0.05% of hydroxyethyl cellulose and has a pH between 6.0 and 6.4 and a Brookfield viscosity of four centipoises. Part of this solution is removed at a rate of about 25 pounds per hour so as to maintain a constant amount of coagulant in the system.

The continuous sheet of coagulum 28 mils thick leaves the bath at the rate of 18 feet per minute and contains about 150 pounds, per 100 pounds of dry polychloroprene, of aqueous solution of approximately the same composition as the bath.

This sheet is strong and self-supporting, of uniform width and thickness, and of porous structure allowing easy washing and drying and has the other desirable properties discussed above. When washed and dried, the material is within the specifications required for regular commercial production of polychloroprene in plasticity and in the modulus, tensile strength, elongation at break, water swell, and scorch time of the compounded and cured elastomer. It contains the calcium salts of the acids of the original disproportionated rosin. These salts act as stabilizers.

*Example 2*

The latex used in the above example is first treated with carbon dioxide until the pH is reduced from 12 to 8.4, requiring about 0.43 pound of gas per 100 pounds of polychloroprene. It is then coagulated as in Example 1, except that only 0.69 pound of calcium chloride in aqueous solution per 100 pounds of polychloroprene is required to completely coagulate the film. The bath composition at equilibrium is as in Example 1, however. The coagulated film is washed and dried as in Example 1 and gives a similar product with plasticity and vulcanizate properties within the established specifications. In addition, unlike the product obtained in the other examples, it is completely soluble in aromatic solvents without any residue of gel and gives a solution of the same viscosity as that of a solution of the same concentration of a polychloroprene isolated by coagulation by freezing.

*Example 3*

The latex used in Example 1 is contained in an upright glass cylinder 4 inches in diameter and 6 inches high with the bottom formed by two glass semicircles, with their straight edges polished and about 8 mils apart, forming the slit for extruding the latex into the coagulating bath. The level of the coagulating bath is kept somewhat above the level of the slit and a head of latex is maintained in the glass cylinder. The coagulum formed at the slit is removed as formed. The coagulating bath contains 0.1% by weight each of calcium chloride, and hydroxyethyl cellulose. These concentrations are maintained by adding 0.59 pound each of calcium chloride and hydrogen chloride and 0.175 pound of hydroxyethyl cellulose as aqueous solutions per 100 pounds of polychloroprene fed as latex. After equilibrium is reached, the bath also contains 0.63% of sodium chloride and has a pH of about 2. The coagulant is removed from the path at the rate of about 150 pounds per 100 pounds of polychloroprene fed, in order to keep a constant amount of coagulant in the bath. The sheet formed is only about 8 mils thick but is otherwise similar to that formed in Example 1.

*Example 4*

A polychloroprene latex, made like that used in Example 1 but with potassium oleate instead of the sodium salt of disproportionated rosin as the dispersing agent and with an excess of potassium hydroxide instead of sodium hydroxide, is coagulated continuously by the procedure used in Example 1, the bath composition being the same except for the presence of potassium chloride instead of sodium chloride. The resulting film is similar and is readily freed from electrolytes by alternate squeezing and exposing to water, and is then dried by controlled infrared radiation.

The foregoing examples are considered merely representative of processes in which the novel coagulating solution of this invention will perform and in the light of the disclosure, other processes are contemplated and will be obvious to those skilled in the art. Latices of copolymers of polychloroprene with other copolymerizable monomers as previously described will give results similar to the homopolymer used in the foregoing examples, and accordingly, this invention is not limited to coagulation of the homopolymer. Further, within the scope of the present invention are coagulating solutions containing the water-soluble calcium salts and acids previously described, which chemicals can be wholly or partially substituted in appropriate amounts for the prefererd salt and acid, respectively, of the coagulating solution used in the examples and still obtain similar results.

As many apparently widely different embodiments of this invention may be made without departing from the spirit and scope thereof, it is to be understood that this invention is not limited to the specific embodiments thereof except as defined in the appended claims.

What is claimed is:

1. A process for coagulating a chloroprene polymer latex wherein the polymer of said latex is dispersed in an aqueous solution of an alkali metal salt of a water-insoluble carboxylic acid of the aliphatic and cycloaliphatic series, comprising contacting said polymer latex with an aqueous coagulating solution containing, with reference to the weight of water in said coagulating solution, 0.1 to 0.5% by weight of a water-soluble calcium salt, 0.05 to 0.15% by weight of hydroxyethyl cellulose, and sufficient acid to maintain said coagulating solution during coagulation at a pH of not greater than 6.5.

2. A process for coagulating a chloroprene polymer latex wherein the polymer of said latex is dispersed in an aqueous solution of an alkali metal salt of a water-insoluble carboxylic acid of the aliphatic and cycloaliphatic series, comprising contacting said polymer latex with an aqueous coagulating solution containing, with reference to the weight of water in said coagulating solution, 0.1 to 0.5% by weight of calcium chloride and 0.05 to 0.15% by weight of hydroxyethyl cellulose, maintaining a pH of not greater than 6.5 for said coagulating solution during coagulation by addition of acid thereto, thereby forming a chloroprene polymer coagulum, and thereafter withdrawing from said coagulating solution said coagulum in the form of a continuous structure.

3. The process of claim 2 wherein the acid added to the coagulating solution to maintain a pH of not greater than 6.5 is hydrochloric acid.

4. The process of claim 2 wherein the pH of the chloroprene polymer latex is less than 8.5 prior to coagulation.

5. The process of claim 2 wherein sufficient carbon dioxide is added to the chloroprene polymer latex prior to coagulation to adjust the pH of said latex to be less than 8.5.

References Cited in the file of this patent

UNITED STATES PATENTS

| | | |
|---|---|---|
| 2,814,550 | Gunderman et al. | Nov. 26, 1957 |
| 3,053,824 | Heinz | Sept. 11, 1962 |